United States Patent
Stappaerts

[19]

[11] Patent Number: 6,016,210
[45] Date of Patent: Jan. 18, 2000

[54] SCATTER NOISE REDUCTION IN HOLOGRAPHIC STORAGE SYSTEMS BY SPECKLE AVERAGING

[75] Inventor: Eddy Alfons Stappaerts, San Ramon, Calif.

[73] Assignee: Northrop Grumman Corporation, Los Angeles, Calif.

[21] Appl. No.: 08/990,313

[22] Filed: Dec. 15, 1997

[51] Int. Cl.[7] .............................. G03H 1/22; G11C 13/04
[52] U.S. Cl. ................................ 359/10; 359/1; 365/125; 365/216
[58] Field of Search .................... 359/10, 11, 1, 359/22, 24, 3, 4, 7, 35, 25; 365/125, 216, 234, 235, 103, 109; 369/103, 109

[56] References Cited

U.S. PATENT DOCUMENTS

| | | | |
|---|---|---|---|
| Re. 30,166 | 12/1979 | Lee | 365/122 |
| 3,650,595 | 3/1972 | Gerritsen et al. | 350/3.5 |
| 3,698,010 | 10/1972 | Lee | 340/174 |
| 3,720,453 | 3/1973 | Lee et al. | 350/3.5 |
| 3,756,684 | 9/1973 | Fox | 350/3.5 |
| 3,785,712 | 1/1974 | Hannan | 350/3.5 |
| 3,867,009 | 2/1975 | Pawluczyk | 350/3.5 |
| 3,871,740 | 3/1975 | Matsubara et al. | 350/3.5 |
| 3,917,380 | 11/1975 | Kato et al. | 350/3.5 |
| 4,013,338 | 3/1977 | Sato et al. | 350/3.5 |
| 4,478,490 | 10/1984 | Wreede et al. | 350/162.11 |
| 4,768,881 | 9/1988 | Juptner et al. | 356/347 |
| 4,945,528 | 7/1990 | Crasemann | 369/59 |
| 4,984,856 | 1/1991 | Moss et al. | 350/3.67 |
| 5,016,953 | 5/1991 | Moss et al. | 350/3.66 |
| 5,105,287 | 4/1992 | Moss et al. | 359/3 |
| 5,223,355 | 6/1993 | Hampp et al. | 430/1 |
| 5,299,035 | 3/1994 | Leith et al. | 359/9 |
| 5,337,170 | 8/1994 | Khoury et al. | 359/7 |
| 5,363,363 | 11/1994 | Gage | 369/116 |
| 5,471,328 | 11/1995 | Wreede | 359/22 |
| 5,491,682 | 2/1996 | Dohmeier et al. | 369/124 |
| 5,642,210 | 6/1997 | Stoll et al. | 359/10 |

*Primary Examiner*—Jon Henry
*Attorney, Agent, or Firm*—Terry J. Anderson; Karl J. Hoch, Jr.

[57] ABSTRACT

A method and an apparatus for increasing detection signal-to-noise ratio, while reading out a hologram from a holographic storage medium, are disclosed. The hologram is written by interfering a write reference beam with an object beam. The method comprises the steps of (1) effecting multiple sequential hologram-read operations using multiple read reference beams separated from each other by a separation angle; (2) shifting the detector array contents in between hologram-read operations such that the data signal patterns incident on the detector array are approximately identical but the incident scatter noise patterns are uncorrelated; and (3) integrating the multiple hologram readouts electronically on the detector array. The apparatus comprises a laser source, a beamsteerer, a detector array and a shifting device.

24 Claims, 1 Drawing Sheet

SCATTER NOISE REDUCTION IN HOLOGRAPHIC STORAGE SYSTEMS BY SPECKLE AVERAGING

FIELD OF THE INVENTION

The present invention relates generally to methods and apparatus for improving the performance of holographic storage systems, and more particularly to a method and an apparatus for reducing the effect of detection noise due to optical scattering in a holographic storage medium.

BACKGROUND OF THE INVENTION

It is well known that holography can be used to store massive digital data in a small storage volume, such as a photo-refractive crystal, for a later readout.

A number of configurations exist for holographic storage systems, particularly with respect to the multiplexing techniques used for maximizing storage density. A commonly used configuration is shown in FIG. 1. The primary components of this system are an input device, a holographic storage medium such as a photo-refractive crystal, and an output device. The input device, usually implemented by a spatial light modulator (SLM), consists of an array of amplitude modulators. The output device is a detector array such as a charge-coupled-device (CCD) which receives the output radiation from the storage medium during a hologram readout.

During a hologram-write operation, data are inputted into the SLM in the form of amplitude modulations of the pixels of the SLM. A laser beam illuminates the SLM, and the resulting object beam emanating from the SLM pixels interferes with a write reference beam in the storage medium to create a large number of gratings, one for each SLM pixel. During a hologram-readout operation, a read reference beam illuminates the storage medium, resulting in reflected radiation from each of the stored gratings. The radiation from each grating is detected by a CCD pixel. As an example, for a SLM and a CCD with 1024 by 1024 pixels each, a single hologram (page) stores 1024×1024=1 Mbit of binary data per page. If more than two gray levels are used, the data per page increases by the number of bits. Thus, for 16 gray levels (4 bits), the storage density increases by a factor of four, to 4 Mbits per page in the above example.

Noise sources in holographic storage systems have a number of physical origins. The primary sources are (1) light scattered from the storage medium, (2) light scattered from optical components, (3) intra-page pixel crosstalk, (4) inter-page crosstalk and (5) detector noise. Light scattered from the storage medium, called scatter noise, severely affects the detection signal-to-noise ratio (SNR) which is a critical parameter directly linked to the performance of holographic storage systems.

When the holographic storage medium is illuminated by the read reference beam, the detectors receive electric fields from both the stored data and from optical scatterers. Scattering from optical components, external to the holographic storage medium, can be minimized using conventional techniques such as anti-reflection coatings. However, scattering from the storage medium itself represents a much more difficult problem since it originates within the same physical volume as the data and since its spectral characteristics are identical to those of the data electric field.

Furthermore, in some storage media such as iron-doped $LiNbO_3$, scatter noise has been observed to increase with increasing iron doping level. A higher iron concentration is desirable because it improves other system parameters such as hologram erasure time. Thus, reduction of scatter noise will allow other system parameters to be optimized.

The present invention discloses a method and an apparatus for reading the information stored in the holographic storage medium such that the detected scatter noise component of the electric field emerging from the holographic storage medium is reduced. Specifically, the invention reduces scatter noise which has the characteristics of laser speckle. The scatter noise intensity is a random complex variable with finite mean. The voltage recorded by each pixel of the CCD array during a hologram readout, due to incident data signal and noise electric fields, can be written in complex variable notation as:

$$V \sim |E_s + E_n e^{i\theta}|^2 \qquad (1)$$

or $$V \sim E_s^2 + 2 E_s E_n \cos(\theta) + E_n^2 \qquad (2)$$

where $E_s$ and $E_n$ are the magnitudes of the data and scatter noise electric fields, respectively, and $\theta$ is their relative phase shift. If the scatter is due to a large number of stationary sites in the holographic storage medium, then it has the characteristics of laser speckle. In that case the intensity, $I_n$, which is equal to $E_n^2$, is a random variable with an exponential probability distribution and the phase, $\theta$, is uniformally distributed in the interval $[-\Pi, \Pi]$. The probability density function of the scatter noise intensity $I_n$ is:

$$p(I_n) = \frac{1}{\langle I_n \rangle} e^{-\frac{I_n}{\langle I_n \rangle}} \qquad (3)$$

where $\langle I_n \rangle$ denotes the average value of $I_n$. Although the invention is described for the case where the scatter noise electric field has the characteristics of speckle, it has general applicability, regardless of the statistics of the scatter field.

According to Equation (2), the scatter noise has two contributions, represented by the second and third terms on the right hand side of Equation (2). In a practical system, $E_n$ is much smaller than $E_s$, and the second term dominates the expression for scatter noise. As an example, for $E_n^2/E_s^2 = 10^{-2}$, $V \sim 1 + 0.2 * \cos(\theta) + 0.01$. For $\theta$ near 0 or $\pi$, the maximum noise voltage is 0.01 without the second term, and approximately $\pm 0.2$ with the second term included. The corresponding voltage SNR is 100 in the first case and only 5 in the second case. The present invention discloses a method and an apparatus for greatly decreasing the second term of Equation (2) and thereby increasing the detection signal-to-noise ratio.

SUMMARY OF THE INVENTION

A method and an apparatus for mitigating scatter noise in output patterns of a hologram, while reading out the hologram from a holographic storage medium, are disclosed. The hologram is written by interfering a write reference beam and an object beam. The method comprises the following steps: (a) illuminating the holographic storage medium with a first read reference beam propagating along the centerline of the write reference beam; (b) producing a first hologram output pattern, which includes a first data signal pattern and a first noise pattern, from the holographic storage medium; (c) illuminating the holographic storage medium with a succeeding read reference beam which forms a separation angle with the first read reference beam; and (d) producing a succeeding hologram output pattern, from the holographic storage medium, which includes a succeeding data signal pattern and a succeeding noise pattern; the succeeding data signal pattern substantially corresponds to the first data signal pattern translated by a distance related to the separation angle, while the succeeding noise pattern is uncorrelated to the first noise pattern.

In the preferred embodiment of the present invention, the succeeding read reference beam lies in the plane defined by the write reference beam and the normal to a write plane which is defined by the centerline of the write reference beam and the centerline of the object beam.

The first and succeeding read reference beams may be propagating in the direction of the write reference beam, or in the opposite direction of the write reference beam, in which case the output electric field is the complex conjugate of the object electric field. The present invention applies to both configurations.

In the preferred embodiment, the method of the present invention further comprises the steps of: (1) recording the first hologram output pattern on a detector array having M rows of pixels, the recorded first hologram output pattern having a first signal-to-noise ratio; (2) transferring electric charges of pixels in each originating row of the M rows of pixels to corresponding pixels in a subsequent row located at a distance equal to the translation distance between the first data signal pattern and the succeeding data signal pattern; and (3) recording the succeeding hologram output pattern on the detector array such that electric charges associated with the succeeding hologram output pattern are added to preexisting electric charges of pixels in the detector array resulting in the recorded succeeding hologram output pattern having a signal-to-noise ratio substantially greater than the first signal-to-noise ratio.

In the preferred embodiment, the translation distance between sequential data signal output patterns is equal to an integer multiple of the row-to-row pixel pitch which is the distance between consecutive rows of the detector array.

The disclosed method can be repeated in sequence for N-2 times, where N is an integer greater than 2 and much smaller than the number of rows of the detector array, each time for a distinct value of the separation angle, in order to produce a final recorded hologram output pattern which has a final power signal-to-noise ratio approximately N times larger than the first signal-to-noise ratio obtained with a single hologram-read operation.

In the preferred embodiment of the invention, the sequential read reference beams have the same diffraction-limited angle, also called diffraction angle of spread, and the separation angle between two consecutive read reference beams is equal to this diffraction-limited angle. Furthermore, the row-to-row pixel pitch of the detector array is proportional to the separation angle between two consecutive read reference beams.

The first read reference beam is preferably produced by a laser source. The succeeding read reference beam is preferably produced by directing the first read reference beam to a desired direction using a beamsteerer. The beamsteerer can be an electromechanical beamsteering device or an acousto-optic beamsteering device.

The detector array is preferably a charge-coupled-device (CCD). For a system with long read durations, a conventional CCD combined with an electro-mechanical positioning device for physically translating the CCD in between read operations can be used. For a system with short read durations, the preferred embodiment uses a CCD-type camera where the electrical charges are electronically shifted in between read pulses, without moving parts. At each CCD pixel, electrical charges due to the multiple read pulses are electronically integrated by the CCD.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of the steps for constructing and operating the invention in connection with the illustrated embodiment. It is to be understood, however, that the same or equivalent functions may be accomplished by different embodiments that are also intended to be encompassed within the spirit and scope of the invention.

Figure 1:
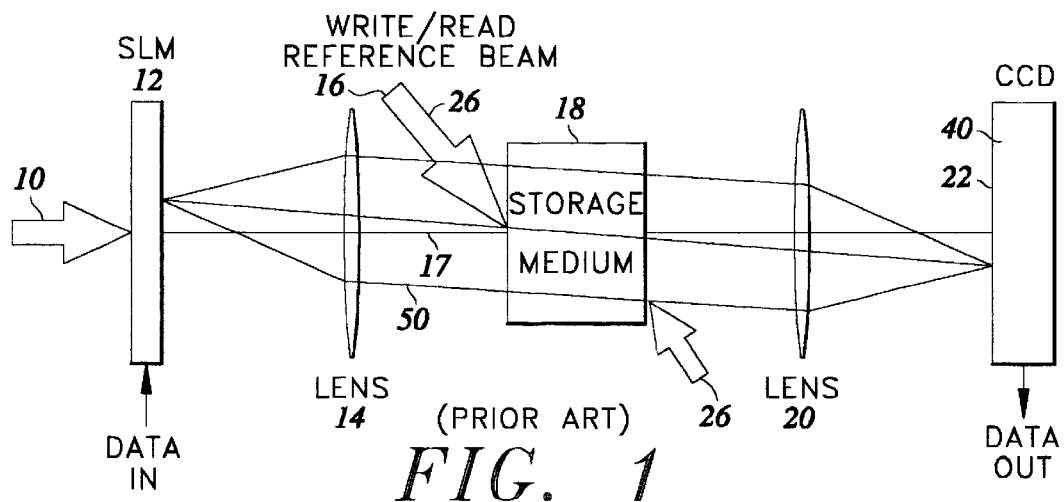
FIG. 1 shows the schematic of a holographic storage system.

The present invention relates to the commonly used holographic storage system depicted in FIG. 1. Typical components of this system include a spatial light modulator (SLM) 12, a holographic storage medium 18, and an charged-coupled-device (CCD) detector array 40. During a hologram-write operation, data are input into the SLM 12 in the form of amplitude modulations of the pixels of the SLM's array. A laser beam 10 illuminates the SLM 12, passes through a collimating lens 14, and interferes with a write reference beam 16 in the storage medium 18 to create a large number of gratings, one for each SLM pixel. During a conventional hologram-read operation, a read reference beam 26, typically propagating in the same direction as the write reference beam 16 as shown in FIG. 1, illuminates the storage medium 18, resulting in reflected radiation from each of the storage gratings. The radiation from all the storage medium gratings passes through a focusing lens 20 and produces an output pattern 22 at the focal plane of the focusing lens. A CCD detector array 40 records the intensity of the output pattern 22. The read reference beam 26 can be co-propagating with the write reference beam 16, i.e., propagating in the same direction as the write reference beam 16, as illustrated in FIG. 1, or it can be counter-propagating 26, i.e., propagating in the opposite direction of the write reference beam 16, in which case the output field is the complex conjugate of the object electic field. The invention applies to both configurations. The aforementioned configuration and operations are well established and thus constitute prior art.

The present invention discloses a method and an apparatus for reading the information stored in the holographic storage medium 18 such that the detected scatter noise component of the electric field emerging from holographic storage medium is reduced. Specifically, the invention reduces scatter noise which has the characteristics of laser speckle. The invention is described for the case where the scatter noise electric field has the characteristics of speckle, but has general applicability regardless of the statistics of the scatter field.

Figure 2:
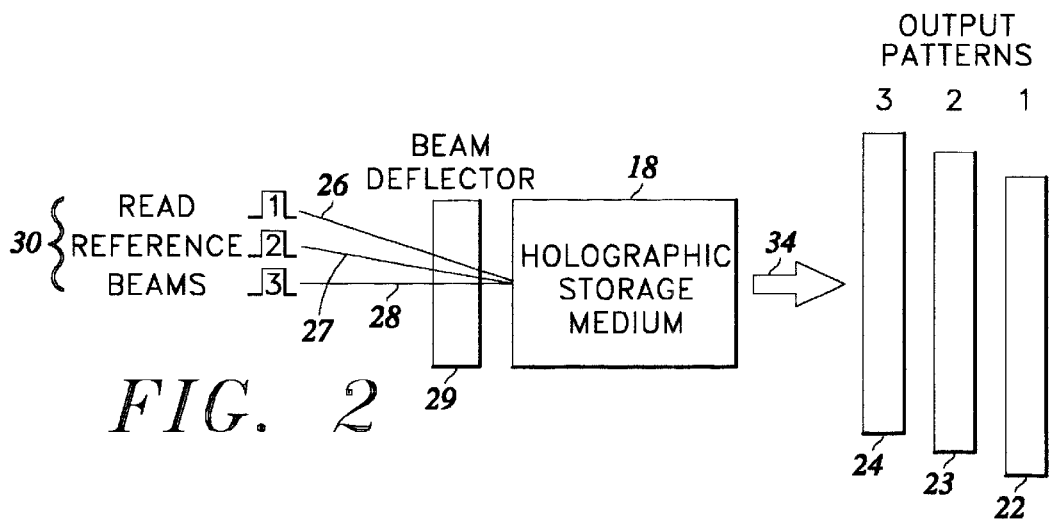
FIG. 2 illustrates the concept of speckle noise averaging of the present invention. The figure shows three read reference beams, incident at different angles on the holographic medium, resulting in three spatially shifted output image patterns which have the same data signal but uncorrelated noise. By translating the detector array up (or down, depending on the direction of a sequential read reference beam) in between read pulses by an amount equal to the row-to-row pixel pitch, an output image pattern can be made to coincide with a preceding output image pattern in each of the sequential readouts. The data signal patterns are therefore added while speckle noise is reduced due to the of uncorrelated noise patterns.
Figure 3:
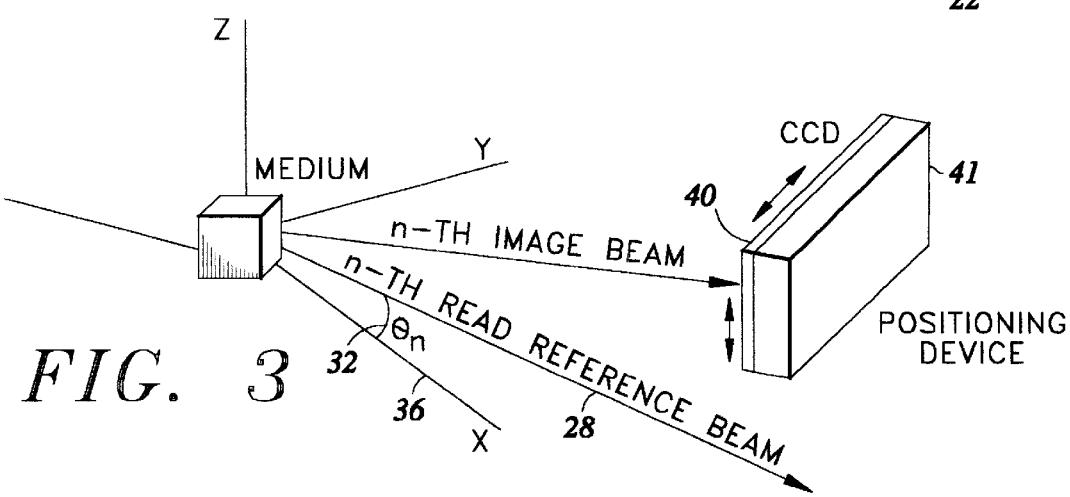
FIG. 3 illustrates the geometry of one of the multiple read reference beams. The figure shows the CCD and the directions of the read reference and output image beams for the n-th readout. The x-axis coincides with the centerline of the write reference beam. The multiple reference beams are all in the (x,z) plane, at a varying angle, $\theta_n$, with respect to the x-axis. The angular separation between adjacent reference beams is the common diffraction-limited angle of the read reference beams, $\Delta\theta \sim \lambda/w$, where $\lambda$ is the laser wavelength and w the laser beam size as measured at the laser source aperture.

In the preferred embodiment of FIG. 2, the holographic storage medium 18 is illuminated by a sequence of read reference beams 30 which are separated in angle by at least one diffraction-limited angle $\Delta\theta_d \sim \lambda/w$ where $\lambda$ is the wavelength of each of the read reference beams 30, w is the width of each of the read reference beams 30, as measured at their sources. Referring to FIG. 1, the write reference beam 16 and the centerline 17 of the write object beam 50 define a "write" plane. Orthogonal to this write plane and containing the write reference beam 16 is the plane hereafter referred to as the read plane. Referring to FIG. 2, the sequential read reference beams 30 lie in the read plane. Referring to FIG. 3, the x-y plane represents the write plane, and the x-z plane represents the read plane. Referring to FIGS. 1 and 3, the x-axis 36 coincides with the centerline 17 of the write reference beam 16. In the read plane, the n-th read reference beam 28 forms an angle $\theta_n$ 32 with respect to the x-axis 36, which is the centerline 17 of the write reference beam 16 in FIG. 1. If the separation angle between successive read reference beams 30 is the diffraction-limited angle $\Delta\theta_d$, then the n-th read reference beam 28 makes an angle $\theta_n = (n-1)\Delta\theta_d$ with respect to the centerline 17 of the write reference beam 16. As illustrated in FIG. 2, the multiple read reference beams 26, 27, 28 result in multiple hologram output patterns 22, 23, 24, respectively, which have substantially the same data signal pattern but are spatially shifted.

In the preferred embodiment, the optical collection system, which consists primarily of the focusing lens 20 and the CCD detector array 40, is designed such that the angular separation between successive read reference beams 30 corresponds to a shift equal to the separation between consecutive rows of pixels, called the row-to-row pixel pitch, on the CCD detector array 40. If, in between read operations, the pixels of the CCD detector array 40 are shifted by an amount equal to the shift of the image beam 34, then the data signal patterns detected by the array will be the same for each of the read operations, and the total detected data signal will be the same as the one obtained with a single reference read beam having an energy equal to the sum of the energies of the multiple sequential read reference beams 30. However, unlike the data signal electric field, which is substantially the same for each of the multiple read reference beams 30, the scatter noise electric fields produced by the multiple read reference beams are different. If the scatter noise has the characteristics of speckle, then the scatter noise electric field patterns, resulting from multiple read reference beams 30 separated from each other by at least one diffraction-limited angle of a read reference beam, are spatially uncorrelated. The cumulative scatter noise, resulting from adding these spatially uncorrelated electric field patterns, has a smaller statistical variance than the scatter noise resulting from a single read reference beam having an energy equal to the sum of energies of the multiple read reference beams. The reduction factor of the statistical variance is approximately equal to the number of read reference beams. For example, if the total read energy is split equally among 16 beams, then the variance of the cumulative scatter noise is approximately 16 times smaller than the variance of scatter noise resulting from a single read reference beam which has the same total read energy, and the power signal-to-noise ratio is increased by a factor of approximately 16. Thus, for N multiple hologram-read operations, the final power signal-to-noise ratio will be approximately N times larger than the signal-to-noise ratio obtained with a single, conventional hologram-read operation.

If the scatter noise is spatially varying more slowly, then the angular separation between consecutive read reference beams must be increased accordingly such that the translation of the output patterns on the detector array exceeds the scatter noise spatial correlation distance.

As the angle $\theta_n$ is increased with respect to the x-axis 36, a small amount of distortion occurs in the output data signal pattern, as compared to the output data signal pattern resulting from the first read reference beam which propagates along the x-axis. Thus, the maximum number of read reference beams, which are separated from each other by the diffraction-limited angle, depends on the amount of distortion that can be tolerated. This maximum number of read reference beams is dependent on a given holographic storage system. Typical values for this number are in the range of 16 to 64.

The read reference beams 30 may be produced by the same laser which is used to generate the write reference beam in the hologram-write operation. This laser may be a solid-state laser producing a train of short pulses. Steering of the read reference beam 26 can be accomplished by an electromechanical beam deflector or an acousto-optic beam deflector 29.

The shift of the CCD detector array 40 contents can be realized mechanically, by physically translating the detector array with positioning device 41, or electronically, by transferring charges from pixels of each row to the corresponding pixels in a subsequent row. The subsequent row is preferably the adjacent row. If N read reference beams separated from each other by the diffraction-limited angle are used, the CCD detector array 40 must have N blank rows at the start of a hologram-read cycle. The direction of the shift of the CCD detector array 40 contents depends on the direction of a sequential read reference beam, which determines the shift of the resulting output beam 34. As illustrated in FIG. 2, the multiple read reference beams 26, 27, 28 result in multiple hologram output patterns 22, 23, 24, respectively.

The primary components required to implement the present invention are (1) a laser source for generating the multiple read reference beams, (2) a beamsteerer for directing the multiple read reference beams to desired directions, and (3) a detector array with a means for shifting its row contents in between read operations.

The characteristics of these components are dictated by the duration of the hologram-read operations. Systems where the hologram storage medium is moving rapidly (during either a translation or a rotation) typically use short read durations, while systems where the storage medium is static or slowly-moving use longer read durations. The long-read type of system typically uses low peak power lasers with relatively long pulse durations, in the order of milliseconds to seconds, while the short-read type typically uses much shorter, high peak power laser pulses, in the order of nanoseconds to microseconds.

In the case of long read durations, the laser source may be a semiconductor laser which is pulsed on and off by controlling the electrical current. With a rapidly moving hologram storage medium, the laser source is typically a solid state laser with a special means such as a high speed electro-optic modulator to generate the required pulse train waveform.

Characteristics of a beam deflector or a beamsteerer for directing the read reference beam to a desired direction are also dependent on the system architecture. Thus, requirements for lower speed systems can be met by electro-mechanical beam deflectors, while high speed systems require technologies such as acousto-optic beam deflectors which can change the laser beam direction by a diffraction-limited angle in a time duration as short as 100 nanoseconds.

Detector array technologies are similarly dependent on system architecture. With longer read durations, a conventional CCD combined with an electromechanical positioning device for physically translating the CCD in between read operations can be used. For the short-read type of system, the preferred implementation uses a CCD-type camera where the electrical charges are electronically shifted in between read pulses, without moving parts. At each CCD pixel, electrical charges due to the multiple read pulses are electronically integrated by the CCD. Such CCDs, with shift durations as short as 100 nanoseconds, are within the state-of-the-art.

A high speed implementation of the invention may have a duration of 100 nanoseconds for each read operation. The system may use a solid-state laser for producing the train of short pulses, each typically 10 nanoseconds long, with 100-nanosecond pulse separation. Beam deflection may be accomplished with an acousto-optic beam deflector with an aperture transit time of less than 100 nanoseconds. Hologram detection may be implemented using a CCD-type camera as described above, with each row being shifted to an adjacent row every 100 nanoseconds. Signal-to-noise improvement by a factor of approximately 32 is realized in such a system using a burst of 32 read pulses, in a total read-burst duration of 3.2 microseconds.

It is understood that the exemplary holographic storage systems described herein and shown in the drawings represent only presently preferred embodiments of the invention. Indeed, various modifications and additions may be made to such embodiments without departing from the spirit and scope of the invention. For example, the read reference beams need not be equally separated from each other as illustrated. Those skilled in the art will recognize that various other physical or optical configurations are equivalent and therefore likewise suitable. Thus, these and other modifications and additions may be obvious to those skilled in the art and may be implemented to adapt the present invention for use in a variety of different applications.

What is claimed is:

1. A method for mitigating scatter noise in output patterns of hologram while reading out a hologram from a holographic storage medium, the hologram being written by interfering a write reference beam and an object beam, the method comprising the steps of:

(a) illuminating the holographic storage medium with a first read reference beam propagating along a centerline of the write reference beam;
   (b) producing a first hologram output pattern from the holographic storage medium, the first hologram output pattern including a first data signal pattern and a first noise pattern;
   (c) recording the first hologram output pattern on a detector array having M rows of pixels, the recorded first hologram output pattern having a first signal-to-noise ratio;
   (d) transferring electric charges of pixels in each originating row of the M rows of pixels to corresponding pixels in a subsequent row of the M rows of pixels, the distance between an originating row and a subsequent row being equal to the translation distance between the first data signal pattern and the succeeding data signal pattern;
   (e) illuminating the holographic storage medium with a succeeding read reference beam, the succeeding read reference beam forming a separation angle with the first read reference beam;
   (f) producing a succeeding hologram output pattern from the holographic storage medium, the succeeding hologram output pattern including a succeeding data signal pattern and a succeeding noise pattern, the succeeding data signal pattern substantially corresponding to the first data signal pattern shifted by a translation distance related to the separation angle, the succeeding noise pattern being uncorrelated to the first noise pattern; and
   (g) recording the succeeding hologram output pattern on the detector array such that electric charges associated with the succeeding hologram output pattern are added to preexisting electric charges of pixels in the detector array, the recorded succeeding hologram output pattern having a signal-to-noise ratio substantially greater than the first signal-to-noise ratio.

2. The method as recited in claim 1 wherein the succeeding read reference beam lies in a plane defined by the write reference beam and a normal to a write plane, said write plane being defined by the centerline of the write reference beam and the centerline of the object beam.

3. The method as recited in claim 1 wherein the separation angle is within the range of 16 to 64 times a diffraction-limited angle of the first read reference beam, the diffraction-limited angle being a function of read reference beam wavelength and read reference beam width.

4. The method as recited in claim 1 wherein the first and succeeding read reference beams are propagating in the direction of the write reference beam.

5. The method as recited in claim 1 wherein the first and succeeding read reference beams are propagating in the opposite direction of the write reference beam.

6. A method for increasing detection signal-to-noise ratio in real time, while reading out a hologram from a holographic storage medium, the hologram being written by interfering a write reference beam and an object beam, the method comprising the steps of:

(a) illuminating the holographic storage medium with a first read reference beam propagating along the centerline of the write reference beam;
   (b) producing a first hologram output pattern from the holographic storage medium, the first hologram output pattern including a first data signal pattern and a first noise pattern;
   (c) recording the first hologram output pattern on a detector array having M rows of pixels, consecutive rows of the M rows of pixels being separated by a row-to-row pixel pitch, the recorded first hologram output pattern having a first signal-to-noise ratio;

(d) transferring electric charges of pixels in each originating row of the M rows of pixels to corresponding pixels in a subsequent row of the M rows of pixels, the distance between an originating row and a subsequent row being an integer multiple of the row-to-row pixel pitch;

(e) illuminating the holographic storage medium with a succeeding read reference beam, the succeeding read reference beam forming a separation angle with the first read reference beam and lying in a plane defined by the write reference beam and a normal to a write plane, the write plane being defined by a centerline of the write reference beam and a centerline of the object beam;

(f) producing a succeeding hologram output pattern from the holographic storage medium, the succeeding hologram output pattern including a succeeding data signal pattern and a succeeding noise pattern, the succeeding data signal pattern substantially corresponding to the first data signal pattern shifted by a translation distance equal to said integer multiple of the row-to-row pixel pitch and related to the separation angle, the succeeding noise pattern being uncorrelated to the first noise pattern; and (g) recording the succeeding hologram output pattern on the detector array such that electric charges associated with the succeeding hologram output pattern are added to preexisting electric charges of pixels in the detector array, the recorded succeeding hologram output pattern having a signal-to-noise ratio substantially greater than the first signal-to-noise ratio.

7. The method as recited in claim 6 wherein steps (d) though (g) are repeated in sequence for N-2 times, where N is an integer greater than 2 and much smaller than the number of rows of the detector array, each time for a distinct value of the separation angle, to produce a final recorded hologram output pattern having a final signal-to-noise ratio approximately N times larger than the first signal-to-noise ratio.

8. The method as recited in claim 6 wherein the first and succeeding read reference beams are propagating in the direction of the write reference beam.

9. The method as recited in claim 6 wherein the first and succeeding read reference beams are propagating in the opposite direction of the write reference beam.

10. The method as recited in claim 6 wherein the separation angle is equal to the diffraction-limited angle of the first read reference beam, the diffraction-limited angle being a function of read reference beam wavelength and read reference beam width.

11. The method as recited in claim 6 wherein the row-to-row pixel pitch is proportional to the separation angle.

12. The method as recited in claim 6 wherein the succeeding read reference beam is produced by directing the first read reference beam to a desired direction using an electro-mechanical beamsteering device.

13. The method as recited in claim 6 wherein the succeeding read reference beam is produced by directing the first read reference beam to a desired direction using an acousto-optic beamsteering device.

14. The method as recited in claim 6 wherein the detector array is a charge-coupled-device.

15. The method as recited in claim 6 wherein the step of transferring electric charges of pixels in each originating row of the M rows of pixels to corresponding pixels in a subsequent row of the M rows of pixels comprises the step of physically shifting the detector array by the translation distance using an electro-mechanical positioning device.

16. The method as recited in claim 6 wherein the step of transferring electric charges of pixels in each originating row of the M rows of pixels to corresponding pixels in a subsequent row of the M rows of pixels is performed electronically.

17. A system for mitigating scatter noise in output patterns of a hologram while reading out a hologram from a holographic storage medium, the hologram being written by interfering a write reference beam and an object beam, the system comprising:

(a) a radiation source for generating a first read reference beam, the first read reference beam illuminating the holographic storage medium to produce a first hologram output pattern including a first data signal pattern and a first noise pattern, the first read reference beam propagating along the centerline of the write reference beam; and (b) a detector array for recording the first hologram output pattern, the detector array having M rows of pixels, consecutive rows of the M rows of pixels being separated by a row-to-row pixel pitch, the recorded first hologram output pattern having a first signal-to-noise ratio, the detector array allowing cumulative recording of successive hologram output patterns in real time, said cumulative recording resulting in a final hologram output pattern having a final signal-to-noise ratio substantially greater than the first signal-to-noise ratio;

(c) a shifting device for transferring electric charges of pixels in each originating row of the M rows of pixels to corresponding pixels in a subsequent row of the M rows of pixels, the distance between an originating row and a subsequent row being an integer multiple of the row-to-row pixel pitch; and (d) a beamsteerer for directing the first read reference beam to a desired direction to produce a succeeding read reference beam, the succeeding read reference beam forming a separation angle with the first read reference beam and lying in a plane defined by the write reference beam and a normal to a write plane, the write plane being defined by a centerline of the write reference beam and a centerline of the object beam, the succeeding read reference beam illuminating the holographic storage medium to output a succeeding hologram output pattern, the succeeding hologram output pattern substantially corresponding to the first hologram output pattern translated by a distance equal to an integer multiple of the row-to-row pixel pitch and related to the separation angle.

18. A system for increasing detection signal-to-noise ratio while reading out a hologram from a holographic storage medium, the hologram being written by interfering a write reference beam and an object beam, the system comprising:

(a) a radiation source for generating a first read reference beam, the first read reference beam illuminating the holographic storage medium to produce a first hologram output pattern, the first read reference beam propagating along the centerline of the write reference beam;

(b) a detector array for recording the first hologram output pattern, the detector array having M rows of pixels, consecutive rows of the M rows of pixels being separated by a row-to-row pixel pitch, the recorded first hologram output pattern having a first signal-to-noise ratio, the detector array allowing cumulative recording of successive hologram output patterns in real time, said cumulative recording resulting in a final hologram output pattern having a final signal-to-noise ratio substantially greater than the first signal-to-noise ratio;

(c) a shifting device for transferring electric charges of pixels in each originating row of the M rows of pixels to corresponding pixels in a subsequent row of the M rows of pixels, the distance between an originating row and a subsequent row being an integer multiple of the row-to-row pixel pitch; and (d) a beamsteerer for directing the first read reference beam to a desired direction to produce a succeeding read reference beam, the succeeding read reference beam forming a separation angle with the first read reference beam and lying in a plane defined by the write reference beam and a normal to a write plane, the write plane being defined by a centerline of the write reference beam and a centerline of the object beam, the succeeding read reference beam illuminating the holographic storage medium to output a succeeding hologram output pattern, the succeeding hologram output pattern substantially corresponding to the first hologram output pattern translated by a distance equal to an integer multiple of the row-to-row pixel pitch and related to the separation angle.

19. The system as recited in claim 18 wherein the radiation source comprises a laser source.

20. The system as recited in claim 18 wherein the detector array comprises a charge-coupled device.

21. The system as recited in claim 18 wherein the shifting device comprises an electro-mechanical positioning device for physically translating the detector array by a distance equal to an integer multiple of the row-to-row pixel pitch.

22. The system as recited in claim 18 wherein the shifting device comprises an electronic circuit for electronically effecting transfer of electric charges.

23. The system as recited in claim 18 wherein the beamsteerer comprises an electromechanical beamsteering device.

24. The system as recited in claim 18 wherein the beamsteerer comprises an acousto-optic beamsteering device.

* * * * *